United States Patent
Maess et al.

(10) Patent No.: US 9,683,509 B2
(45) Date of Patent: Jun. 20, 2017

(54) METHOD FOR ACTUATING A SWITCH ELEMENT OF A VALVE DEVICE

(71) Applicant: Robert Bosch GmbH, Stuttgart (DE)

(72) Inventors: Matthias Maess, Boeblingen (DE); Joerg Kuempel, Ludwigsburg (DE); Rainer Wilms, Markgroeningen (DE); Uwe Richter, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 358 days.

(21) Appl. No.: 14/412,307

(22) PCT Filed: Jun. 21, 2013

(86) PCT No.: PCT/EP2013/063005
§ 371 (c)(1),
(2) Date: Dec. 31, 2014

(87) PCT Pub. No.: WO2014/005859
PCT Pub. Date: Jan. 9, 2014

(65) Prior Publication Data
US 2015/0159575 A1    Jun. 11, 2015

(30) Foreign Application Priority Data
Jul. 6, 2012   (DE) .......... 10 2012 211 798

(51) Int. Cl.
*F02M 59/46* (2006.01)
*F02D 41/26* (2006.01)
(Continued)

(52) U.S. Cl.
CPC .......... *F02D 41/26* (2013.01); *F02D 41/20* (2013.01); *F02D 41/2464* (2013.01);
(Continued)

(58) Field of Classification Search
CPC ...... F02D 41/26; F02D 41/3809; F02D 41/20; F02D 41/3845; F02D 41/2464;
(Continued)

(56) References Cited

U.S. PATENT DOCUMENTS 7,240,666 B2 *  7/2007  Okamoto ............. F02D 41/062
                                                      123/446
7,552,720 B2 *  6/2009  Borg .................... F02M 59/366
                                                      123/506
(Continued)

FOREIGN PATENT DOCUMENTS

DE        101 48 218       4/2003
DE     10 2007 030 223     1/2009
(Continued)

OTHER PUBLICATIONS

International Search Report for PCT/EP2013/063005, dated Dec. 2, 2013.

*Primary Examiner* — Hai Huynh
(74) *Attorney, Agent, or Firm* — Gerard Messina

(57) ABSTRACT

In a method for actuating a switch element of a valve device between a first end position and a second end position, in a normal mode within a cycle following an end of a first energization, a movement of the switch element in a first direction effected by the loading device is retarded in a first direction by a brief second energization ("braking pulse") that is introduced within the cycle once a pause period has ended following a characteristic point in time. It is provided that the optimum pause period and/or the optimum variable characterizing the braking pulse be ascertained in an adaptation mode.

8 Claims, 7 Drawing Sheets

(51) Int. Cl.
    *F02D 41/20*       (2006.01)
    *F02D 41/38*       (2006.01)
    *F02D 41/24*       (2006.01)
    *H01F 7/18*        (2006.01)
    *G05D 7/06*        (2006.01)

(52) U.S. Cl.
    CPC ..... *F02D 41/3809* (2013.01); *F02D 41/3845* (2013.01); *G05D 7/0635* (2013.01); *H01F 7/1883* (2013.01); *F02D 2041/2027* (2013.01); *F02D 2041/2037* (2013.01); *F02D 2200/06* (2013.01); *Y10T 137/0318* (2015.04)

(58) Field of Classification Search
    CPC ..... F02D 2041/2027; F02D 2041/2037; F02D 2200/06; F02D 2250/31; F02D 35/0069; G05D 7/0635; H01F 7/1883; Y10T 137/0318; F02M 59/366; F02M 59/466; F02M 57/027; F02M 2037/087

USPC ....... 123/446, 457, 458, 482, 499, 506, 510, 123/511

See application file for complete search history.

(56) References Cited

U.S. PATENT DOCUMENTS

| | | | |
|---|---|---|---|
| 7,568,468 B2* | 8/2009 | Wolber | F02D 41/3845 |
| | | | 123/446 |
| 7,905,215 B2* | 3/2011 | Suzuki | F02D 41/2464 |
| | | | 123/446 |
| 9,303,582 B2* | 4/2016 | Richter | F02D 41/3845 |

FOREIGN PATENT DOCUMENTS

| | | |
|---|---|---|
| DE | 10 2008 054 512 | 6/2010 |
| JP | 2002-514281 | 5/2002 |
| JP | 2012-102723 A | 5/2012 |

* cited by examiner

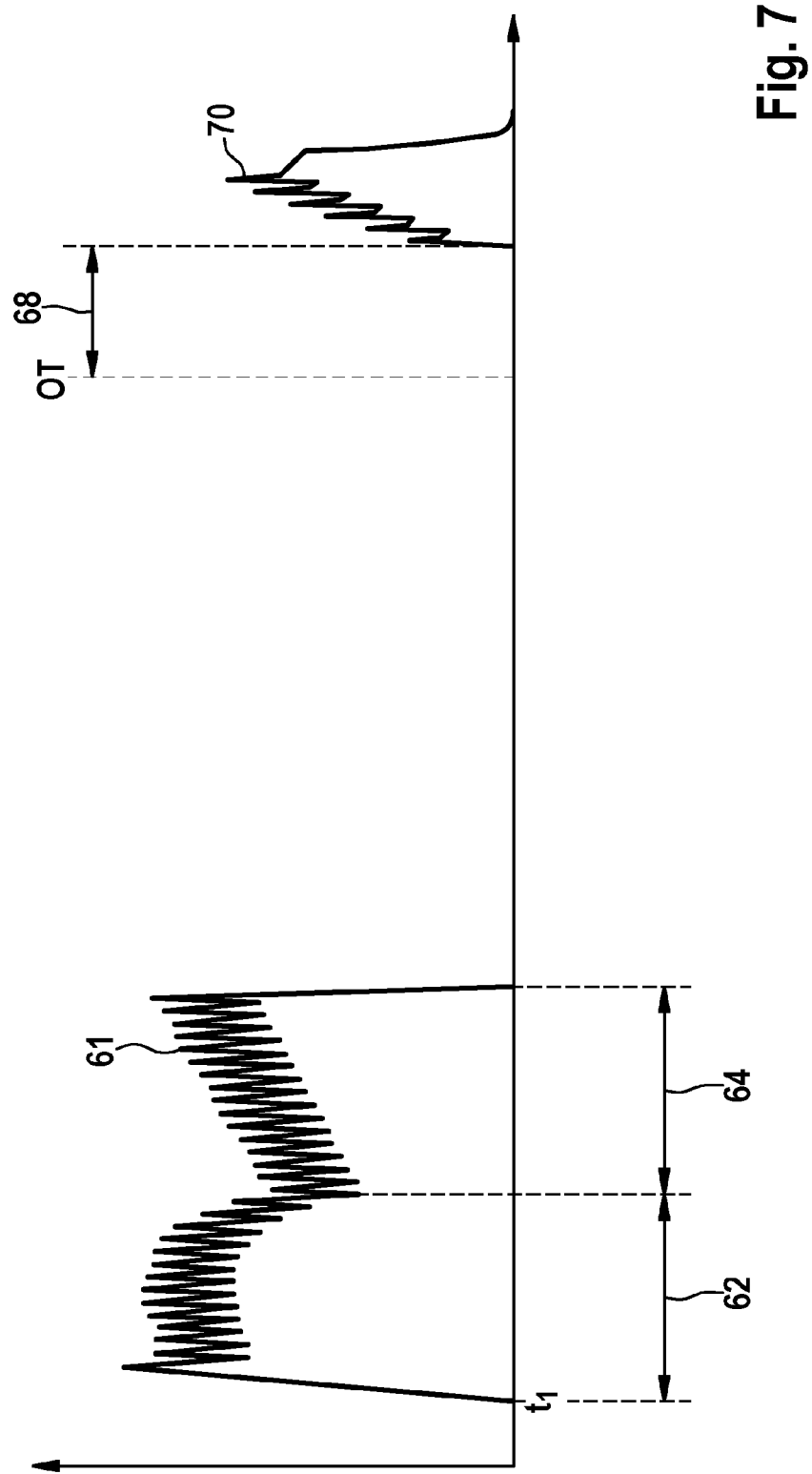

METHOD FOR ACTUATING A SWITCH ELEMENT OF A VALVE DEVICE

BACKGROUND OF THE INVENTION

1. Field of the Invention

The present invention relates to a method for actuating a switch element of a valve device.

2. Description of the Related Art

The published German Patent Application document DE 10 2008 054 512 A1 describes a fuel injection system of an internal combustion engine having a piston fuel pump. The delivery rate thereof is adjusted by a fuel-supply control valve. It includes an inlet check valve that can be positively held in the open position thereof at the beginning of a delivery stroke by a solenoid actuated tappet. As long as this is the case, the fuel does not reach a high-pressure area of the fuel system, but rather is returned to a low-pressure area.

In the case of a normally open fuel-supply control valve, the tappet is pressed by a spring against the valve element, whereas, in response to energization, an electromagnetic actuating device urges the tappet away from the valve element. To reduce the operating noises for a normally open fuel-supply control valve, the published German Patent Application document DE 10 2008 054 512 A1 discusses retarding a movement of the tappet in the direction of the valve element shortly before the tappet strikes a limit stop, by briefly supplying current to the electromagnetic actuating device, thus a "braking pulse." It has been found, however, that it is important that this braking pulse be very precisely timed. The beginning of the braking pulse is defined by the end of what is generally referred to as a "pause period," which, in turn, begins at the start of extinction of a preceding magnetization of a coil of the electromagnetic actuating device. The beginning of the braking pulse, respectively the end of the pause period should correspond very precisely to a specified value to allow the braking pulse to achieve the optimal effect thereof.

Due to the different manufacturing tolerances of the components of the piston fuel pump and of the fuel-supply control valve, the mechanical properties of the tappet, as well as the electrical properties of the electromagnetic actuating device sometimes deviate from the theoretical nominal case. The result can be that, without countermeasures, the braking pulse is no longer generated at the optimum point in time. Therefore, the published German Patent Application document DE 10 2008 054 512 A1 discusses adapting the pause period by utilizing a correlation between the pickup and dropout characteristics of the tappet to perform a correction.

BRIEF SUMMARY OF THE INVENTION

The method according to the present invention makes it possible for the optimum pause period and/or other parameters that are important for an optimum braking pulse to be individually determined for each valve device and as a function of the specific installation situation. It is, therefore, possible to compensate for manufacturing tolerances of the mechanical, as well as of the electrical components by adapting the pause period correspondingly, thereby obtaining an optimum braking pulse and, thus, a low operating noise of the valve device in any case. The method according to the present invention may also be carried out repeatedly, to make it possible to also compensate for wear-induced variations, thereby retaining the desired low noise level over the entire service life of the valve device. If the valve device is reengineered, it is no longer necessary to revise characteristics maps and characteristic curves used for the control thereof, at least within certain limits, since the method according to the present invention provides a direct adaptation that is independent of the control characteristics maps and control characteristic curves.

This considerably facilitates data handling, and the control software may remain unchanged if there are hardware changes.

Besides the aforementioned pause period, it is also possible to correct other parameters of the braking pulse using the method according to the present invention, for example, the duration of individual braking pulse parameters, pulse duty factors used for controlling the electromagnetic actuating device, current levels used for controlling the electromagnetic actuating device, etc. Even the current level of the first control may be optimized using the method according to the present invention.

One of the underlying ideas of the present invention is to establish a correlation between the mechanical and electrical properties of an actual specimen of a valve device and a minimum pause period of this valve device specimen. The minimum pause period is that pause period between a first energization of the electromagnetic actuating device for actuating the switch element and a third energization specially implemented in an adaptation mode that is selected in such a way that the switch element is not influenced, especially in the normal case. On the other hand, upon reaching the minimum pause period, the switch element is again halted by the third energization on the path thereof just traveled to the first end position following the end of the first energization and is moved back to the second end position, where it remains in response to the continuous third energization.

If the minimum pause period is attained by successively reducing (or, in one alternative specific embodiment, by successively prolonging) the pause period, thus, following the end of the first energization, the switch element no longer reaches (respectively, does not again reach) the first end position. This may be determined using suitable processes, for example, appropriate sensors that record the actual position of the switch element or make it possible for this actual switching position to be at least directly determined. If this minimum pause period is ascertained, the pause period to be used in the normal mode may be adapted, respectively corrected as a function of the ascertained minimum pause period. The same also holds for the other variables characterizing the braking pulse.

It is a feature of a first embodiment that the pause period and/or the variable characterizing the braking pulse be adapted as follows: (d1) forming a differential quantity characterizing the difference between a nominal and the ascertained pause period; the nominal pause period having been ascertained under nominal conditions and using a nominal switch element (in the simplest case, the differential quantity may be the difference itself); and (d2) adapting the pause period and/or the variable characterizing the braking pulse as a function of the ascertained differential quantity. The nominal pause period may be determined under nominal conditions and, using a nominal switch element, respectively a nominal valve device, in the laboratory, for example, by taking preliminary measurements of a nominal valve device and under nominal system conditions. In the simplest case, the pause period may be adapted in an additive process using the differential quantity; also possible, however, is the variation in the differential quantity and in the other operating parameters of the braking pulse using a factor that corresponds to the relative deviation of the ascertained pause period from the nominal pause period.

Another embodiment of the method according to the present invention provides that the method be used during operation of a piston fuel pump of a common-rail fuel system, the switch element being a tappet which, in the first end position, may temporarily hold an inlet check valve of the piston fuel pump in an open position ("normally open fuel-supply control valve"). The method according to the present invention may be used very advantageously for this application case that has already been explained in detail at the outset. It holds here, as in the other application cases as well that the third energization may include three phases: first a rising phase of the current that may be realized, for example, by pulse width modulation or by a full energization (generally referred to as "on phase"). This is followed secondly by a holding phase that is current-regulated and features an effective current level. The third phase involves the rapid extinction that is common for electromagnetic actuating devices. The first two phases may be directly combined into one current-regulated phase.

Unlike the first energization, in the adaptation mode, the current level during the holding phase is essentially kept constant. In all application cases, the value of the current level is selected to be low enough to ensure that it is impossible for the tappet to be picked up from the unenergized first end position in the case of all valve devices. On the other hand, for each valve device specimen, the current level must be selected to be high enough to ensure that a dropping out from a picked-up second end position is not possible.

Moreover, in the application cases of the first alternative, the initial pause period is selected to be long enough at the beginning of the adaptation mode to ensure that each switch element is able to drop out from the second into the first end position within the tolerance limits, following the preceding rapid extinction and in the possible installation situations. Due to the selected current level mentioned above, the tappet is initially not able to be retracted into the second end position again during the holding phase of the third energization, since the selected current level of the third energization does not suffice for this purpose. In the specific application case of a fuel-supply control valve, where the third energization is initiated still during a suction phase, the inlet check valve thus also remains at the beginning of the delivery phase, so that the fuel-supply control is functioning regularly.

In the application case of the fuel-supply control valve, in the case of the first alternative during the adaptation mode, the pause period from cycle to cycle, thus from delivery/suction stroke to delivery/suction stroke is shortened in small steps. Starting at a certain shortened pause period, however, the tappet has not yet dropped far enough out of the second into the first end position, so that the tappet is picked up again by the holding phase of the third energization into the energized second end position. There, it remains due to the current level described above, also until after extinction of the holding phase. This may be very readily detected using a fuel-supply control valve and employing various measures. The procedure is the inverse in the second alternative.

Detecting the minimum pause period is especially simple when the third energization lasts beyond a bottom dead center of a pump plunger, thus, from a suction phase to a delivery phase, and the minimum pause period is that pause period in which an unwanted increase in the fuel pressure prevailing in the rail occurs (respectively, in the alternative variant where the unwanted rise in the fuel pressure prevailing in the rail ends). Underlying this is that the inlet valve, due to the tappet remaining in the energized second end position, is not held in the open state by the tappet following the end of the suction phase, rather, instead, the inlet check valve closes immediately in response to the ensuing pressure difference at the beginning of the delivery phase, thereby resulting in a maximum delivery of fuel into the rail. This maximum delivery of fuel into the rail results in an unexpected increase in the rail pressure prevailing there that may be detected very promptly, respectively immediately by a pressure sensor mounted on the rail, for example. Thus, an "unwanted increase in the fuel pressure" prevailing in the rail is an upward deviation of the fuel pressure prevailing in the rail from a specified nominal value.

It is also provided that the characteristic point in time for the beginning of the pause period be an end of the first energization in the normal mode. Alternatively, the characteristic point in time for the beginning of the pause period in the normal mode may be a top dead center of a pump plunger, and the first energization may be ended when the inlet check valve is reliably closed during a delivery stroke. The last mentioned variant has the advantage that the holding phase provided there of the first energization of the electromagnetic actuating device is eliminated in normal operation, whereby the electrical power across the fuel-supply control valve is minimized. Moreover, the effectiveness of the braking pulse is virtually no longer dependent in this case on the mechanical tolerances of a magnetic circuit that is used, thereby again further enhancing the advantages already described above.

Specifically, therefore, no holding phase, from prior to the braking pulse to beyond the top dead center, is used in such a normal mode. Thus, the fuel-supply control valve opens as soon as the top dead center is exceeded, and the pressure prevailing in the delivery chamber of the piston fuel pump falls below an admission pressure prevailing in a low-pressure line present upstream of the delivery chamber. In this case, the dropout time of the tappet is determined by hydraulic parameters (system pressure, cams and the rotational speed of a drive device of a piston fuel pump), however, as described above, no longer by the magnetic properties of the valve device. However, such cams have comparatively high angle tolerances, so that the dropout time required for an exact timing of the braking pulse is only known relatively generally. The present invention makes it possible to ascertain the optimum pause period for such a normal mode as well.

BRIEF DESCRIPTION OF THE DRAWINGS

FIG. 7 is a detail VII of FIG. 6.

DETAILED DESCRIPTION OF THE INVENTION

Figure 1:
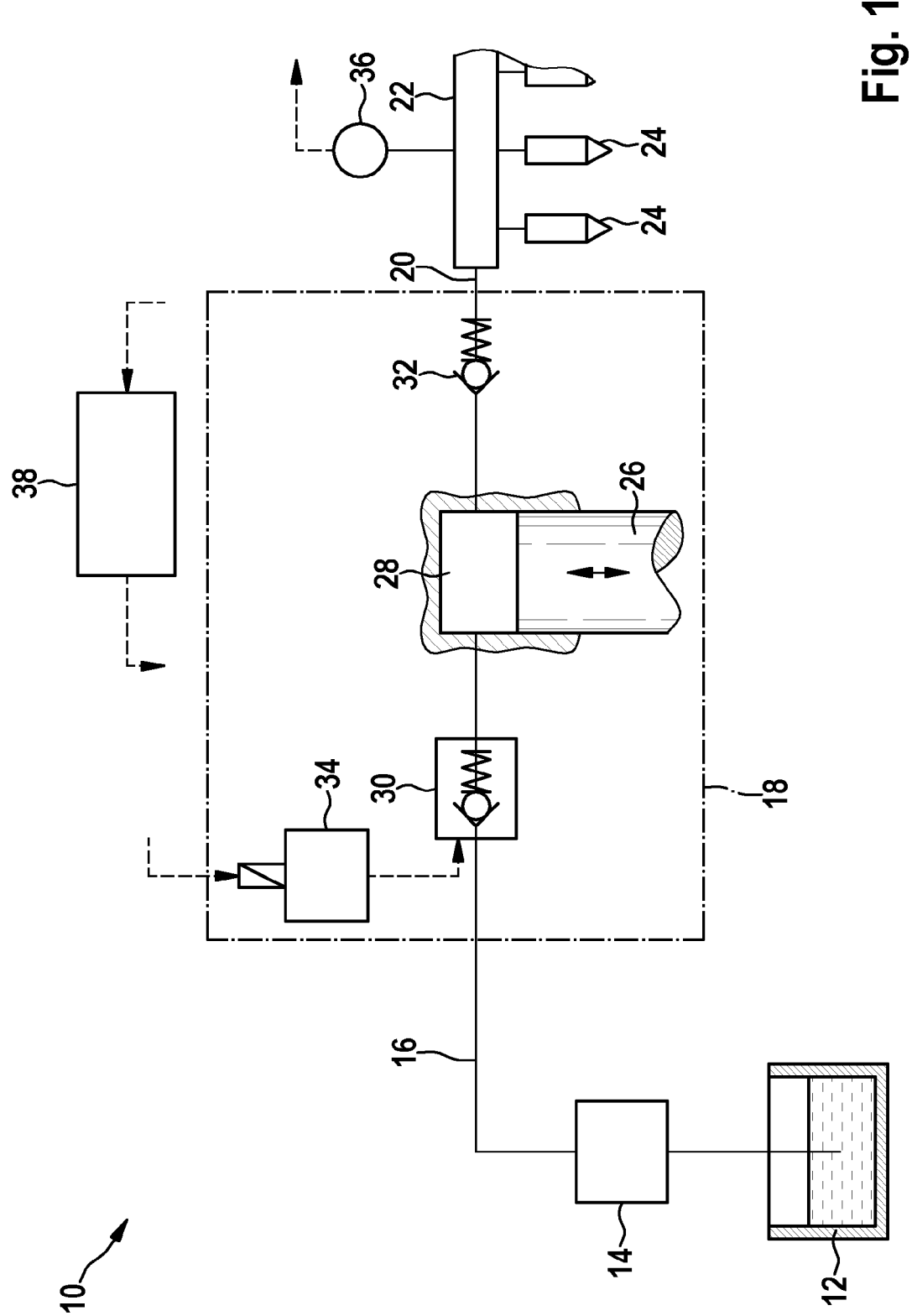
FIG. 1 schematically represents a fuel system of an internal combustion engine having a piston fuel pump and a fuel-supply control valve.

A fuel system for an internal combustion engine is denoted as a whole by reference numeral 10 in FIG. 1. It encompasses a fuel tank 12 from which the fuel is delivered by an electrical pre-supply pump 14 into a low-pressure line 16. This leads to a high-pressure pump in the form of a piston fuel pump 18 that is indicated in FIG. 1 by a dash-dot line. Piston fuel pump 18 delivers the fuel under high pressure into a high-pressure line 20 that leads to a fuel rail 22. Connected thereto are a plurality of injectors 24 that inject the fuel directly into the combustion chambers (not shown) associated therewith.

Piston fuel pump 18 includes a pump plunger 26 that may be set into a reciprocating motion by a camshaft (not shown). Pump plunger 26 bounds a delivery chamber 28 that may communicate via an inlet check valve 30 with low-pressure line 16 and via an outlet check valve 32 with high-pressure line 22. Inlet check valve 30 may be positively held in an open position by an electromagnetic actuating device 34, as is explained in greater detail later herein.

The pressure prevailing in rail 22 is recorded by a fuel-pressure sensor 36. The operation of fuel system 10 is controlled and regulated by a control and regulating device 38 on which a computer program is stored that is programmed for executing corresponding methods.

Figure 2:
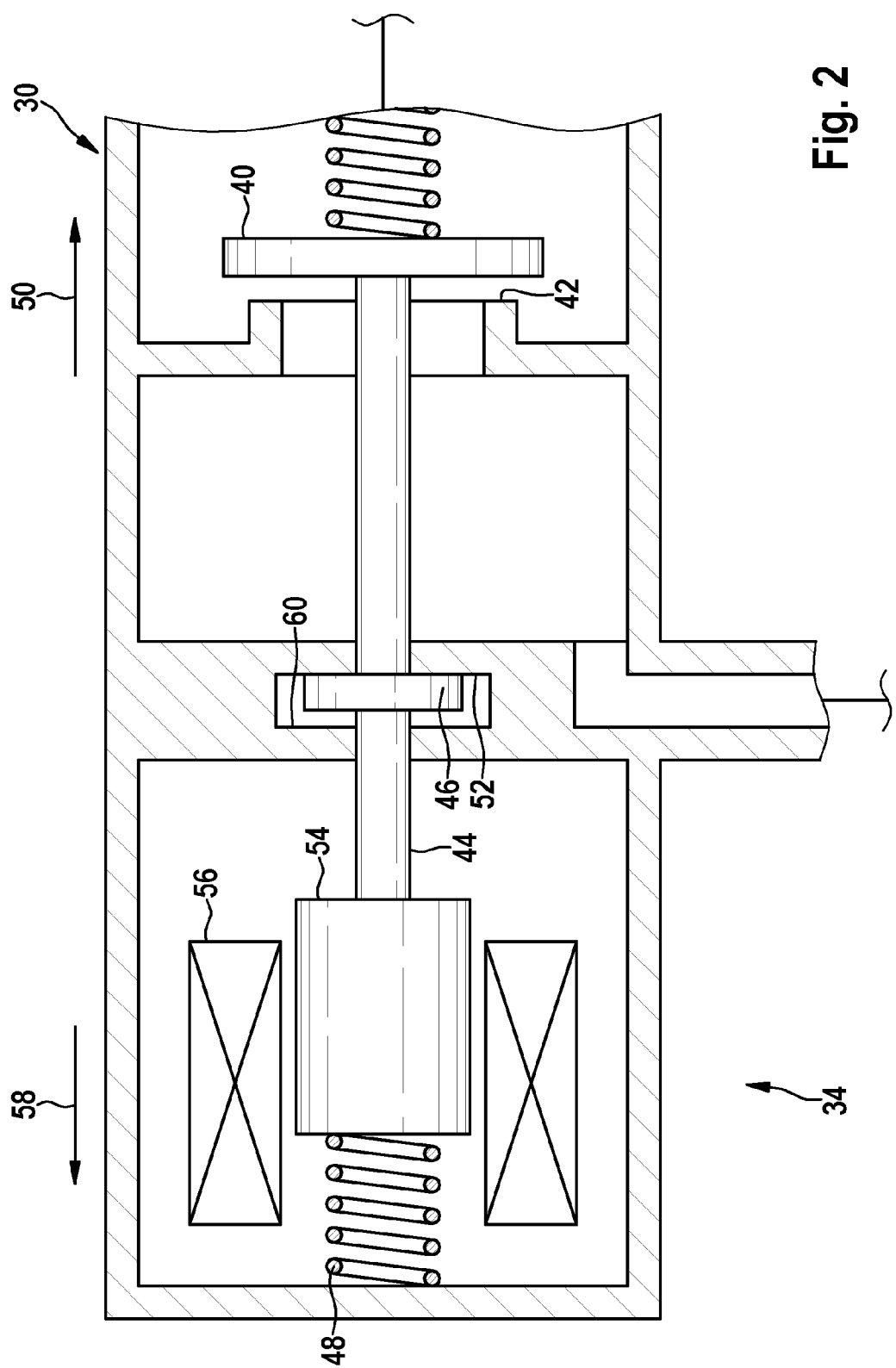
FIG. 2 shows a partial section through the fuel-supply control valve of FIG. 1.

Inlet check valve 30, which may be positively held in an open position by electromagnetic actuating device 34, is also referred to as a fuel-supply control valve. It is schematically shown in FIG. 2. Accordingly, the fuel-supply control valve includes a valve element 40 that cooperates with a valve seat 42, a switch element in the form of a tappet 44 that features a stop portion 46. A loading device in the form of a spring 48 acts upon tappet 44 in a first direction 50 toward a first end position that is defined by a housing stop 52. Connected to tappet 44 is an armature 54, which, in response to an energization of a coil 56, acts upon tappet 44 in a second direction 58 toward a second end position 60 that is defined by a corresponding second housing stop. First and second directions 50 and 58 are mutually opposed. In the unenergized first end position 52 of tappet 44 shown in FIG. 2, it holds valve element 40 of inlet check valve 30, as illustrated, in an open position in response to the force of spring 48. Thus, the valve device illustrated here is a "normally open fuel-supply control valve."

Figure 3:
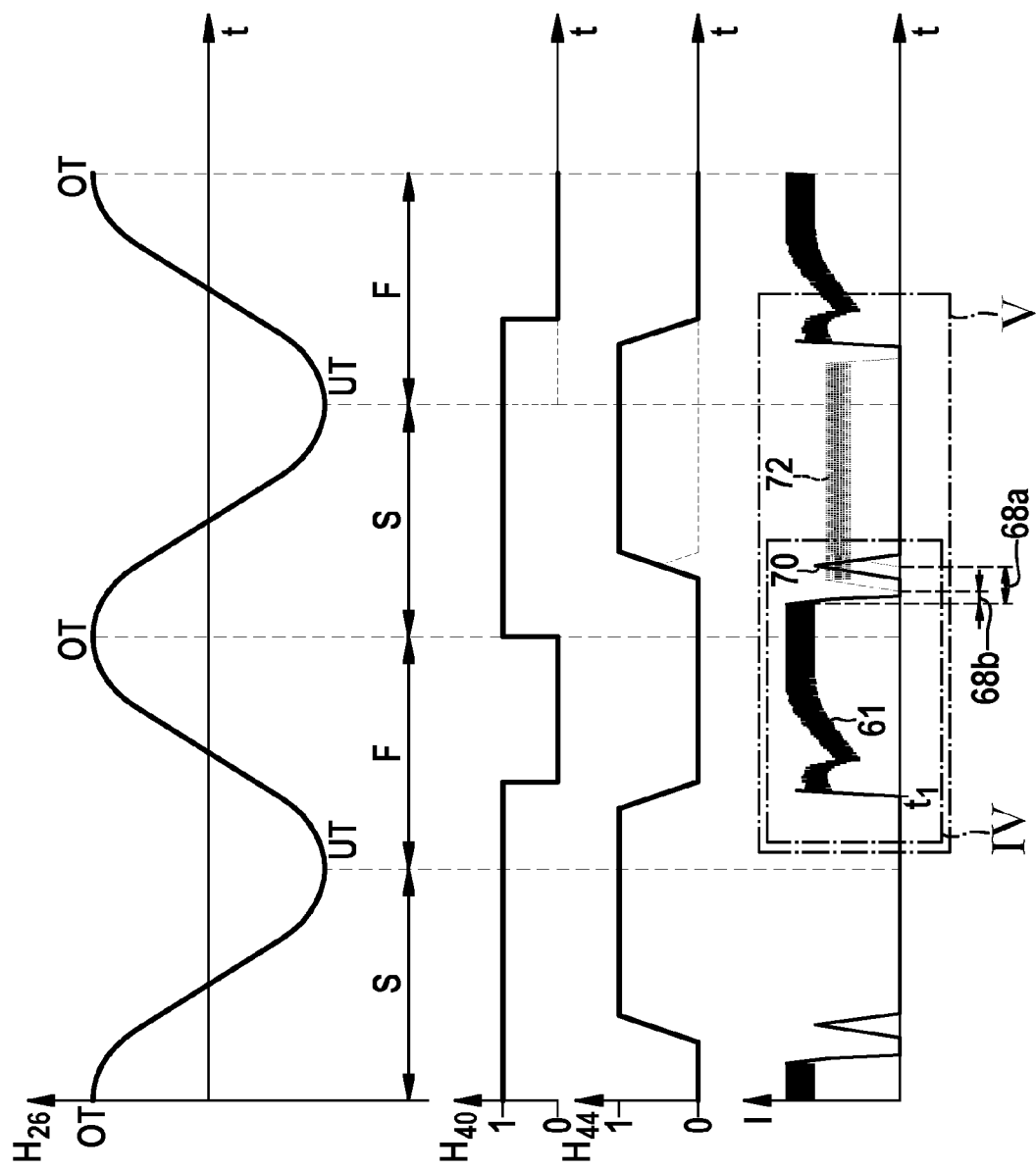
FIG. 3 is a diagram, in which various operating parameters of the piston fuel pump and of the fuel-supply control valve of FIGS. 1 and 2 are plotted over time in a normal mode and in an adaptation mode.

A normal mode of the operation of fuel-supply control valve 34 is first described with reference to FIG. 3. Four characteristic curves of operating parameters of piston fuel pump 18 in said normal mode are plotted in FIG. 3 over time t. Indicated from top to bottom in FIG. 3, these are first a stroke $H_{26}$ of pump plunger 26, a position $H_{40}$ of valve element 40 (0=closed, 1=open), a position $H_{44}$ of tappet 44 (0=second end position 60, 1=first end position 52), and an energization I of coil 56.

Figure 4:
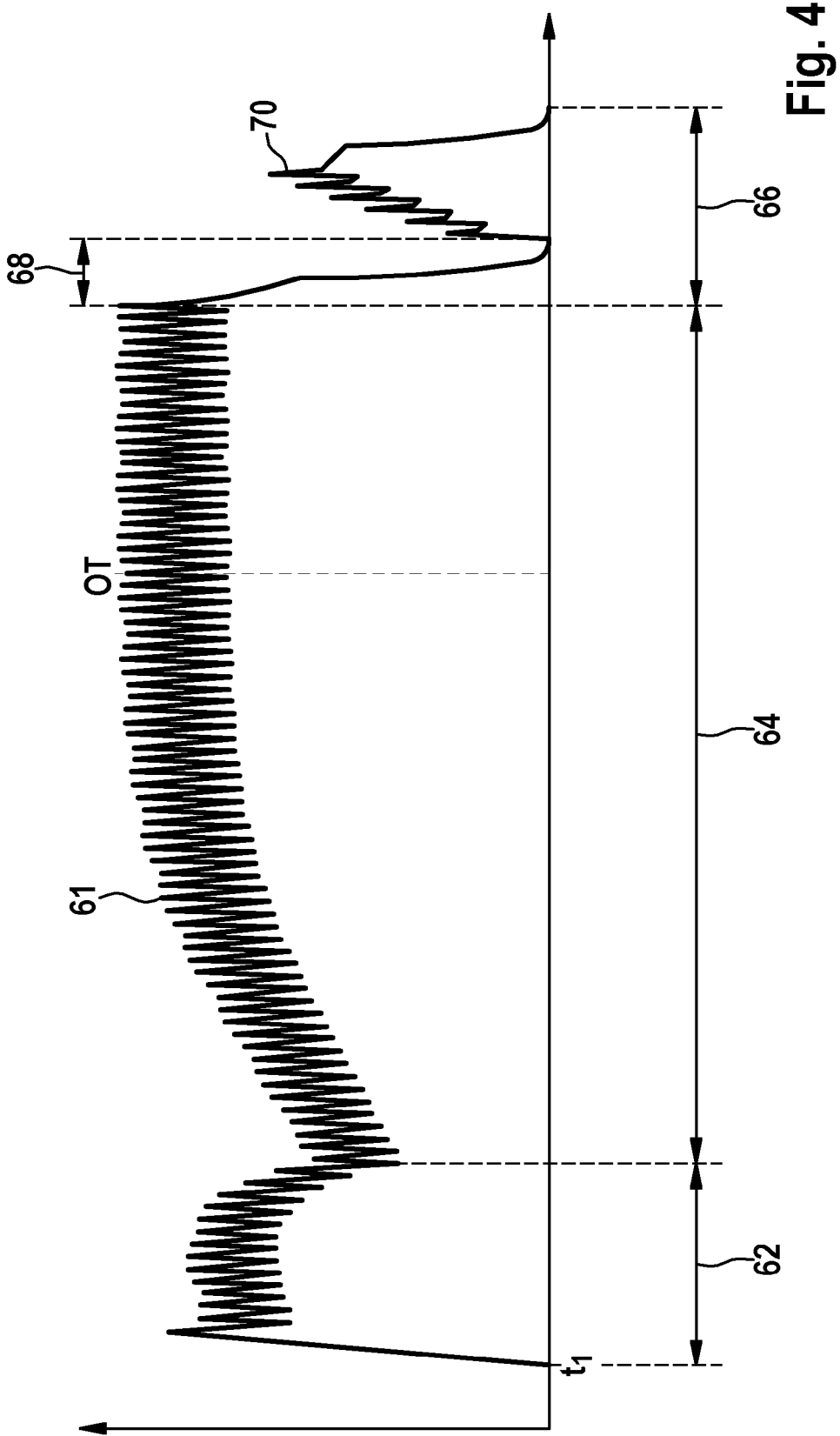
FIG. 4 shows a detail IV of FIG. 3.

Toward the end of a first suction phase S, inlet check valve 30 is open (position 1); coil 56 is not energized; and tappet 44 is in first end position 52 thereof (position 1). After passage through a bottom dead center BDC, a first delivery phase F begins. Due to the fact that tappet 44 continues to be located in first end position 52, valve element 40 is not able to close; thus, inlet check valve 30 remains open. Therefore, fuel from delivery chamber 28 is not delivered into rail 22, rather back into low-pressure line 16. At a point in time $t_1$, coil 56 is energized by a first energization 61 (see also FIG. 4), whereby tappet 44 is picked up into second end position 60 (position 0) thereof. Inlet check valve 30 is now able to close (position 0), so that the fuel is delivered into rail 22. First energization 61 of coil 56 is subdivided into various phases (FIG. 4). It is initially carried out in accordance with a pickup phase 62, which is followed by a holding phase 64 (or, in the case of another specific embodiment (not shown), a plurality of holding phases or current-regulated phases). A rapid extinction 66 takes place subsequently thereto.

Inlet check valve 30 opens again at the beginning of next suction phase S. In response to rapid extinction 66, holding phase 64 ends shortly thereafter. At the end of first energization 61, tappet 44 begins to move again out of second end position 60 into first end position 52 in response to the action by spring 48 (position 1). To reduce the impact noise of stop portion 46 against limit stop 52, which defines the first end position, a second energization 70, which retards the movement of tappet 44 ("braking pulse"), takes place following a pause period 68.

Figure 5:
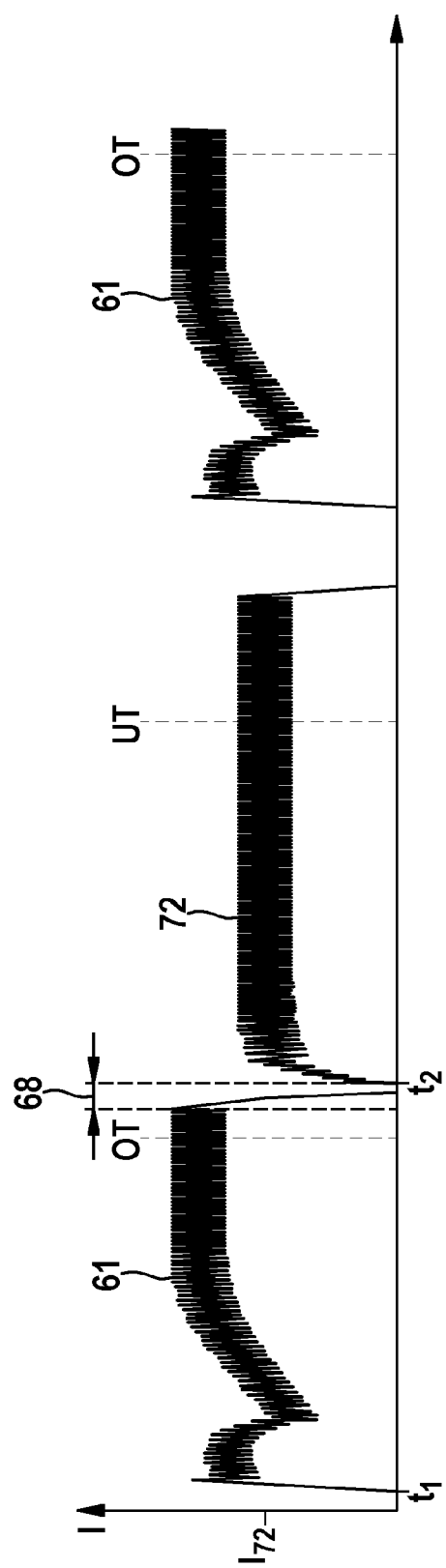
FIG. 5 shows a detail V of FIG. 3.

To determine optimum pause period 68 for an optimum timing of braking pulse 70, the procedure is carried out in an adaptation mode as follows (see also, FIG. 5). Instead of second energization 70, thus, instead of the braking pulse, a third energization 72 is introduced (shown by a dash-dot line in FIG. 3; see also FIG. 4). On the one hand, level $I_{72}$ of this third energization 72 is selected to be so low that it does not allow tappet 44 to be moved out of first end position 52 when it is located therein, and, on the other hand, is selected to be high enough that it does not cause tappet 44 to leave end position 60 when it is located therein. In addition, point in time $t_2$ of the beginning of this third energization 72 is selected to ensure that, following the end of first energization 61 and still before the beginning of third energization 72, tappet 44 arrives reliably in first end position 52 (position 1 in the diagram of FIG. 3). An initial pause period 68a between the end of first energization 61 and the beginning of third energization 72 is derived therefrom.

Pause period 68 is shortened by a specific amount from cycle to cycle. If a minimum pause period 68b (FIG. 3) is reached, an increase in the fuel pressure prevailing in rail 22 recorded by pressure sensor 36 is ascertained. This is due to the fact that, upon reaching minimum pause period 68b, tappet 44, following the end of first energization 61, has not yet moved far enough from second end position 60 into first end position 52, and is, therefore, now urged by third energization 72 back again into second end position 60 (indicated by a dash-dot line in FIG. 3 for parameter $H_{44}$). If suction phase S ends at this point, inlet check valve 32 closes (dash-dot curve for parameter $H_{40}$ in FIG. 3), so that fuel is immediately delivered into fuel rail 22 in response to the beginning of delivery phase F. Thus, the delivery of fuel into rail 22 is at the maximum thereof, which leads there to an increase in the pressure beyond the specified nominal pressure. If such an unwanted increase in the pressure prevailing in rail 22 is ascertained, it may thus be assumed that tappet 44 no longer arrives in first end position 52 once third energization 72 has begun.

This ascertained minimum pause period 68b is now used for adapting pause period 68 in the normal mode. For example, the difference between minimum pause period 68b and a nominal minimum pause period recorded in advance at a nominal fuel-supply control valve under nominal conditions is ascertained, and, on the basis thereof, pause period 68 is adapted thereto in normal operation, thus for the transmission of braking pulse 70.

An alternative variant is described with reference to FIGS. 6 and 7. The same reference numerals are used for functionally equivalent ranges and quantities, and they will not be described again.

Figure 6:
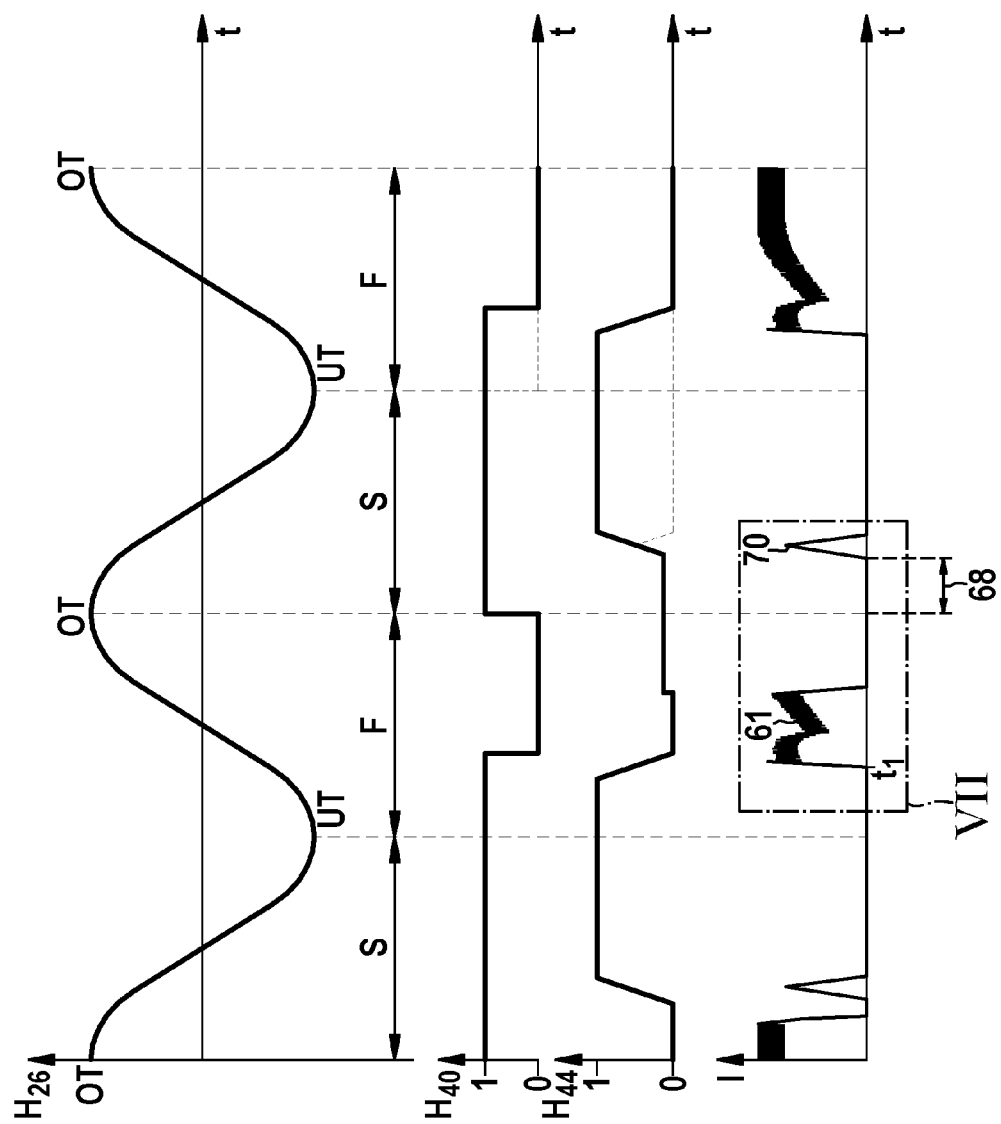
FIG. 6 is a diagram similar to FIG. 3 of a second specific embodiment of a normal mode.

The method described in FIGS. 6 and 7 does not relate to the adaptation mode, rather to the normal mode. In the method illustrated in FIGS. 6 and 7, first energization 61 is ended following a brief holding phase 64, still before reaching top dead center TDC of pump piston 26. Thus, in this case, the characteristic point in time, which signifies the beginning of the pause period, is not the end of first energization 61, rather top dead center TDC. This pause period 68 is adapted by the method described above. It is discernible that, following the end of first energization 61, tappet 44 travels a short path until making contact with valve element 40.

What is claimed is:

1. A method for actuating a switch element of a valve device between a first end position and a second end position, comprising:
    providing a loading device which acts upon the switch element in a first direction toward the first end position;
    providing an electromagnetic actuating device which acts upon the switch element in a second direction toward the second end position in response to a first energization;
    in a normal mode, within a cycle following an end of the first energization, retarding, by a braking pulse, a movement of the switch element in the first direction effected by the loading device, wherein the braking pulse is introduced within the cycle once a pause period has ended following a characteristic point in time; and
    ascertaining, in an adaptation mode, at least one of an optimum pause period and an optimum variable characterizing the braking pulse as follows:
        a. initiating a third energization, the level of the third energization being selected so that (i) the switch element is not able to be moved out of the first end position when the switch element is in the first end position, and (ii) the switch element does not leave the second end position when the switch element is in the second end position, and the characteristic point in time being an end of the first energization, and the pause period being initially selected in such a way that, following the end of first energization and before the beginning of the third energization, the switch element arrives in the first end position;
        b. one of shortening the pause period from cycle to cycle or prolonging the pause period from cycle to cycle;
        c. ascertaining a minimum pause period where the switch element no longer arrives in the first end position before the third energization begins; and
        d. adapting at least one of the pause period and the variable characterizing the braking pulse, again in the normal mode, as a function of the ascertained minimum pause period.

2. The method as recited in claim 1, wherein, in the normal mode, the at least one of the pause period and the variable characterizing the braking pulse is adapted as follows:
    (d1) forming a differential quantity characterizing the difference between a nominal and the ascertained minimum pause period, the nominal pause period having been ascertained under nominal conditions and using a nominal switch element; and
    (d2) adapting the at least one of the pause period and the variable characterizing the braking pulse as a function of the ascertained differential quantity.

3. The method as recited in claim 1, wherein:
    a common-rail fuel system is used during operation of a piston fuel pump; and
    the switch element is a tappet which, in the first end position, temporarily holds an inlet check valve of the piston fuel pump in an open position.

4. The method as recited in claim 3, wherein the third energization lasts beyond a bottom dead center of a pump plunger, and the minimum pause period is a pause period in which an unwanted increase in the fuel pressure prevailing in the rail occurs.

5. The method as recited in claim 4, wherein the characteristic point in time for the beginning of the pause period is an end of the first energization in the normal mode.

6. The method as recited in claim 4, wherein, in the normal mode, the characteristic point in time for the beginning of the pause period is a top dead center of a pump plunger, and the first energization is ended when the inlet check valve is closed during a delivery stroke.

7. A non-transitory, computer-readable data storage medium storing a computer program having program codes which, when executed on a computer, performs a method for actuating a switch element of a valve device between a first end position and a second end position, the method comprising:
    providing a loading device which acts upon the switch element in a first direction toward the first end position;
    providing an electromagnetic actuating device which acts upon the switch element in a second direction toward the second end position in response to a first energization;
    in a normal mode, within a cycle following an end of the first energization, retarding, by a braking pulse, a movement of the switch element in the first direction effected by the loading device, wherein the braking pulse is introduced within the cycle once a pause period has ended following a characteristic point in time; and
    ascertaining, in an adaptation mode, at least one of an optimum pause period and an optimum variable characterizing the braking pulse as follows:
        a. initiating a third energization, the level of the third energization being selected so that (i) the switch element is not able to be moved out of the first end position when the switch element is in the first end position, and (ii) the switch element does not leave the second end position when the switch element is in the second end position, and the characteristic point in time being an end of the first energization, and the pause period being initially selected in such a way that, following the end of first energization and before the beginning of the third energization, the switch element arrives in the first end position;
        b. one of shortening the pause period from cycle to cycle or prolonging the pause period from cycle to cycle;
        c. ascertaining a minimum pause period where the switch element no longer arrives in the first end position before the third energization begins; and
        d. adapting at least one of the pause period and the variable characterizing the braking pulse, again in the normal mode, as a function of the ascertained minimum pause period.

8. A control device for an internal combustion engine of an internal combustion engine, the internal combustion engine having a valve device with a switch element configured to be selectively switched between a first end position and a second end position, the control device comprising:
  a microprocessor configured to perform the following:
    actuating a loading device which acts upon the switch element in a first direction toward the first end position;
    actuating an electromagnetic actuating device which acts upon the switch element in a second direction toward the second end position in response to a first energization;
    in a normal mode, within a cycle following an end of the first energization, retarding, by a braking pulse, a movement of the switch element in the first direction effected by the loading device, wherein the braking pulse is introduced within the cycle once a pause period has ended following a characteristic point in time; and
    ascertaining, in an adaptation mode, at least one of an optimum pause period and an optimum variable characterizing the braking pulse as follows:
      a. initiating a third energization, the level of the third energization being selected so that (i) the switch element is not able to be moved out of the first end position when the switch element is in the first end position, and (ii) the switch element does not leave the second end position when the switch element is in the second end position, and the characteristic point in time being an end of the first energization, and the pause period being initially selected in such a way that, following the end of first energization and before the beginning of the third energization, the switch element arrives in the first end position;
      b. one of shortening the pause period from cycle to cycle or prolonging the pause period from cycle to cycle;
      c. ascertaining a minimum pause period where the switch element no longer arrives in the first end position before the third energization begins; and
      d. adapting at least one of the pause period and the variable characterizing the braking pulse, again in the normal mode, as a function of the ascertained minimum pause period.

* * * * *